(12) United States Patent
Kokubunji et al.

(10) Patent No.: US 6,705,387 B2
(45) Date of Patent: Mar. 16, 2004

(54) MOUNTING STRUCTURE FOR HEAT EXCHANGER AND DUPLEX HEAT EXCHANGER

(75) Inventors: Hiroshi Kokubunji, Kariya (JP); Tatsuo Ozaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/947,108

(22) Filed: Sep. 5, 2001

(65) Prior Publication Data

US 2002/0056541 A1 May 16, 2002

(30) Foreign Application Priority Data

Sep. 7, 2000 (JP) ......................................... 2000-271888

(51) Int. Cl.[7] ............................................... F28F 9/007
(52) U.S. Cl. ........................... 165/67; 165/140; 165/149
(58) Field of Search ........................ 165/67, 140, 144, 165/149; 180/68.4; 123/45, 51

(56) References Cited

U.S. PATENT DOCUMENTS

| 4,938,284 | A | * | 7/1990 | Howells ..................... 165/149 |
| 5,000,257 | A | * | 3/1991 | Shinmura ................... 165/140 |
| 5,086,835 | A | * | 2/1992 | Shinmura ................... 165/144 |
| 5,269,367 | A | * | 12/1993 | Susa et al. .................... 165/67 |
| 5,441,100 | A | * | 8/1995 | Ueda et al. ................... 165/67 |
| 5,535,819 | A | * | 7/1996 | Matsuura .................... 165/149 |
| 5,566,748 | A | * | 10/1996 | Christensen .................. 165/67 |
| 5,975,197 | A | * | 11/1999 | Kado ......................... 165/149 |
| 5,996,684 | A | * | 12/1999 | Clifton et al. ................. 165/67 |
| 6,000,460 | A | * | 12/1999 | Yamanaka et al. ............. 165/67 |
| 6,202,737 | B1 | * | 3/2001 | Mahe .......................... 165/67 |
| 6,223,811 | B1 | * | 5/2001 | Kodumudi et al. ........... 165/67 |
| 6,237,676 | B1 | * | 5/2001 | Hasegawa et al. ............ 165/67 |
| 6,276,445 | B1 | * | 8/2001 | Sasano et al. ............... 165/140 |
| 6,293,334 | B1 | * | 9/2001 | Ghiani ....................... 165/149 |
| 6,318,454 | B1 | * | 11/2001 | Schule et al. ............... 165/140 |

FOREIGN PATENT DOCUMENTS

| JP | 9-257388 | 10/1997 |
| JP | 10-306993 | 11/1998 |
| JP | 10-306994 | 11/1998 |
| JP | 2000-227297 | 8/2000 |

* cited by examiner

Primary Examiner—Leonard Leo
(74) Attorney, Agent, or Firm—Harness, Dickey & Pierce, PLC

(57) ABSTRACT

A bracket (300) is coupled to tank caps (122, 222) of header tanks (120, 220), and the bracket (300) is separably attached to a radiator (200) and a condenser (100) by means of hooks (311, 312) and holes (female screw section) (331) for fixing bolts (330). Thereby, it is unnecessary to provide fixing means in a side plate (130, 230) for fixing the bracket (300) thereto. Accordingly, it is possible to reduce the size and the weight of the side plate (139, 230), and easily attach and detach the radiator (200) and the condenser (100) from a vehicle.

14 Claims, 7 Drawing Sheets

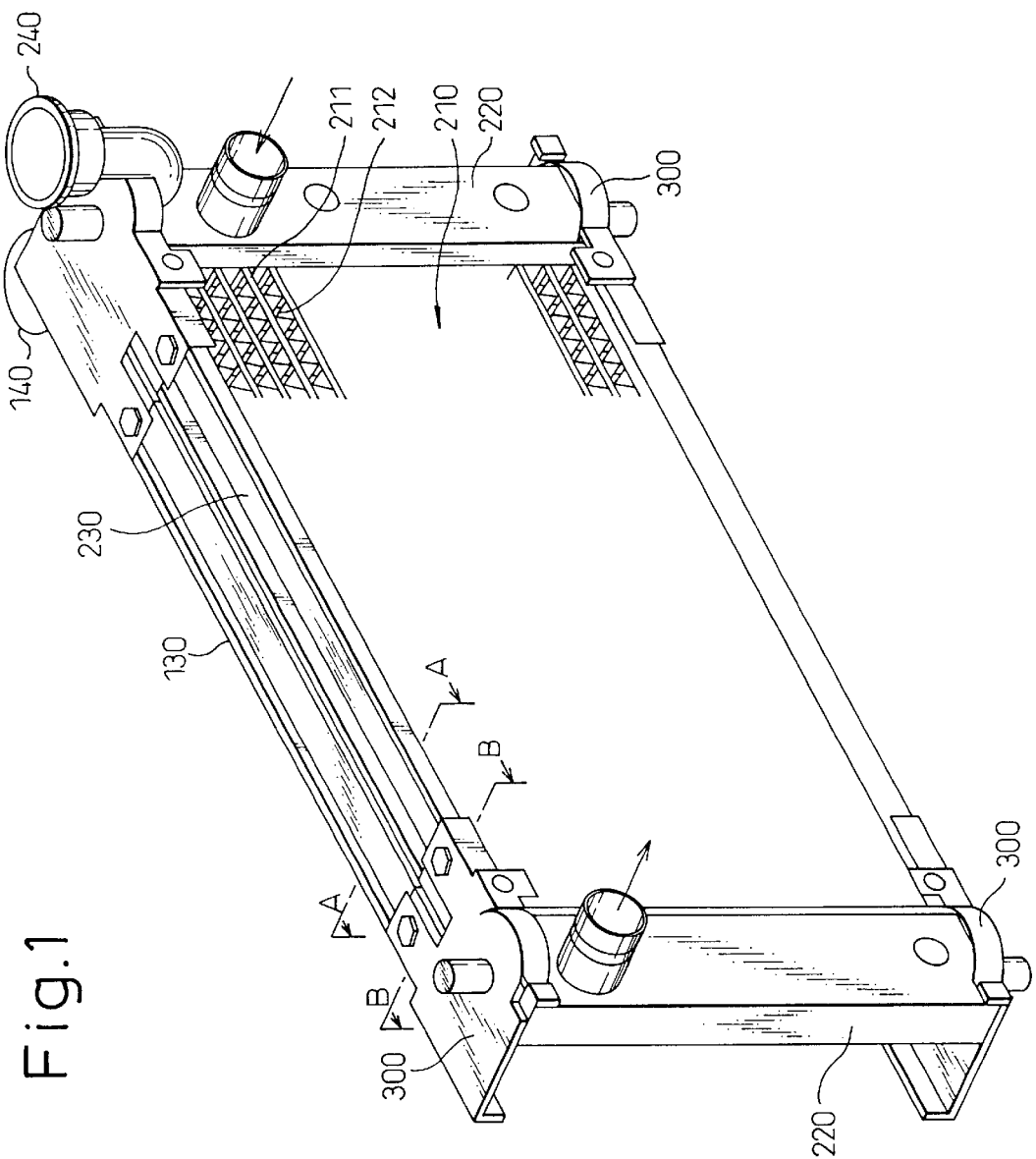

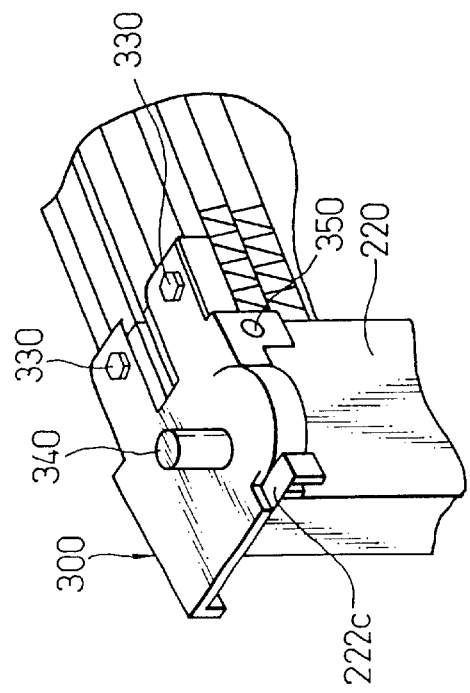
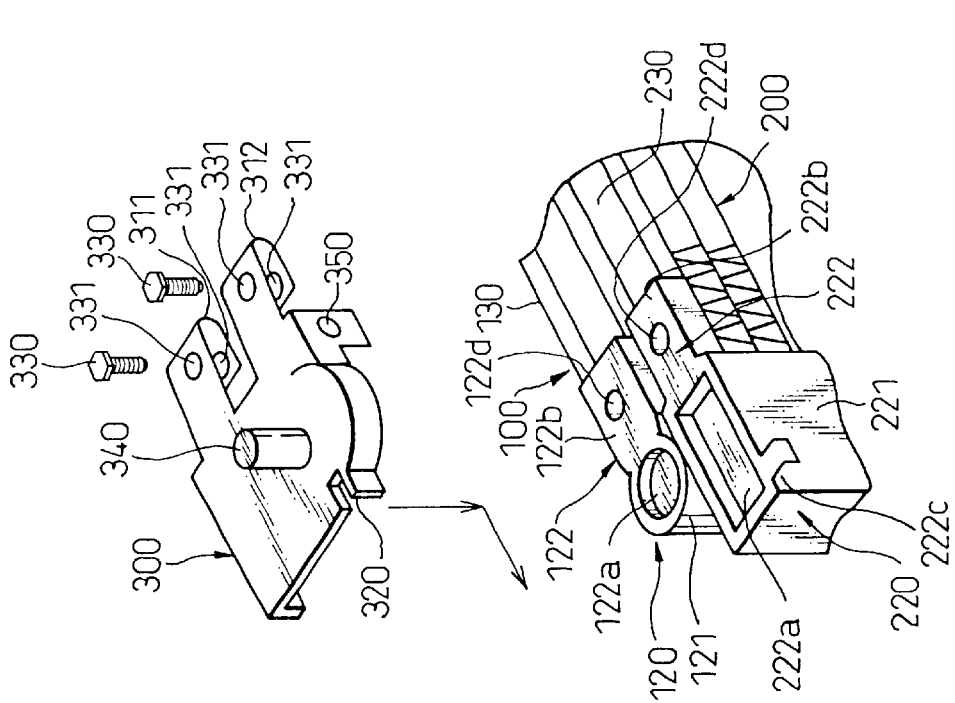

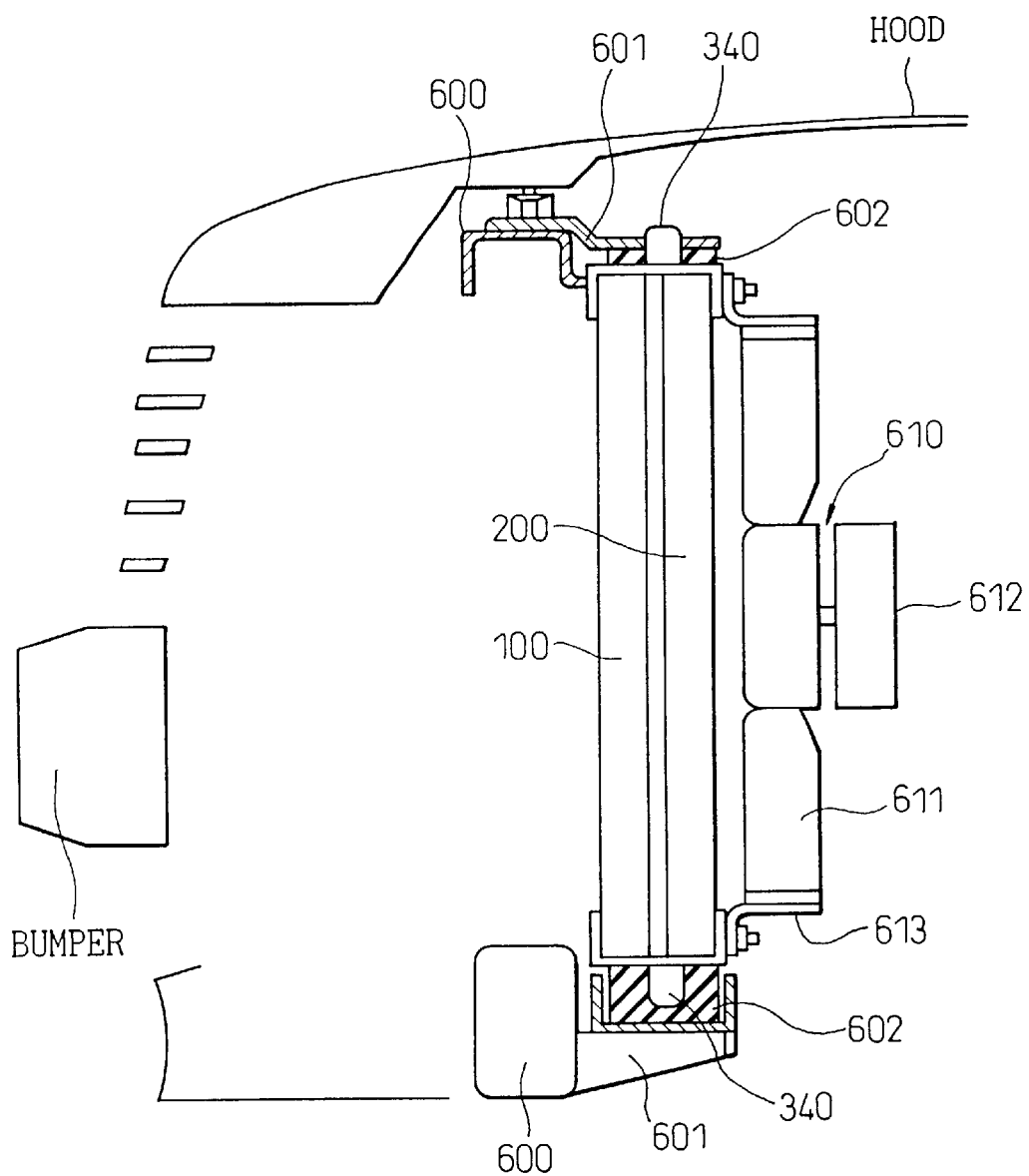

MOUNTING STRUCTURE FOR HEAT EXCHANGER AND DUPLEX HEAT EXCHANGER

BACKGROUND OF THE INVENTION

1. Technical Field of the Invention

The present invention relates to a mounting structure for a heat exchanger, and a duplex heat exchanger. The present invention is suitable for mounting a heat exchanger, such as a radiator for cooling a vehicle engine or a condenser of a car air-conditioner, to a vehicle.

2. Description of the Related Art

For example, Japanese Unexamined Patent Publication (Kokai) No. 9-257388 discloses a structure for mounting a radiator and a condenser to a vehicle, wherein a bracket is fixed to both of a radiator's side plate and a condenser's side plate to integrate the radiator with the condenser, which bracket is then attached to a vehicle.

However, since the bracket is fixed to the side plate according to the invention disclosed in the above Publication, it is necessary to provide means for fixing the bracket to the side plate, such as bolt holes or others, in the side plate, whereby it is difficult to reduce a size and a weight of the side plate.

SUMMARY OF THE INVENTION

In view of the above points, an object of the present invention is to fix a plurality of heat exchangers without fixing a bracket to a side plate.

To achieve the above object, according to one aspect of the present invention, a mounting structure for a heat exchanger is provided, which comprises a heat exchanger comprising a generally rectangular core having a plurality of tubes for flowing fluid therethrough, header tanks, communicating with the plurality of tubes, disposed at each longitudinal opposite end and extending vertical to the longitudinal direction of the tube, and side plates, for reinforcing the core, disposed at each end of the core and extending parallel to the longitudinal direction of the tube, and brackets coupled to each of longitudinal opposite ends of the header tank, for attaching the heat exchanger, wherein the brackets are provided with coupling means for coupling a heat exchanger other than the above-mentioned heat exchanger.

Thereby, as it is unnecessary to provide means for fixing bolts, such as bolt holes, in the side plate, the side plate can be smaller in size and lighter in weight.

According to another aspect of the present invention, a mounting structure for a heat exchanger is provided, which comprises a heat exchanger comprising a generally rectangular core having a plurality of tubes for flowing fluid therethrough, tubular tank bodies communicating with the plurality of tubes, disposed at each of longitudinal opposite ends and extending vertical to the longitudinal direction of the tube, header tanks bonded to the tank bodies for closing each of longitudinal ends thereof, and side plates for reinforcing the core disposed at each of ends of the core and extending parallel to the plurality of the tube, and brackets coupled to the tank cap, for mounting the heat exchanger to a vehicle.

According to further aspect of the present invention, a duplex heat exchanger is provided which comprises a first heat exchanger comprising a generally rectangular first core having a plurality of first tubes through which a first fluid flows, first header tanks disposed at each of longitudinal opposite ends of the first tubes and extending vertical to the longitudinal direction of the first tube to communicate with the plurality of the first tubes, and first side plates disposed at each end of the first core and extending parallel to the longitudinal direction of the first tube to reinforce the first core, a second heat exchanger comprising a generally rectangular second core having a plurality of second tubes through which a second fluid flows, second header tanks disposed at each of longitudinal opposite ends of the second tubes and extending vertical to the longitudinal direction of the second tube to communicate with the plurality of the second tubes, and second side plates disposed at each end of the second core and extending parallel to the longitudinal direction of the second tube to reinforce the second core, and brackets separably fastened to each of longitudinal opposite ends of both the header tanks for mounting both the heat exchangers thereto.

Thereby, as it is unnecessary to provide means for fixing bolts, such as bolt holes, in the side plate, the side plate can be smaller in size and lighter in weight.

According to a further aspect of the present invention, a duplex heat exchanger is provided which comprises a first heat exchanger comprising a generally rectangular first core having a plurality of first tubes through which a first fluid flows, first header tanks disposed at each of longitudinal opposite ends of the first tubes and extending vertical to the longitudinal direction of the first tube to communicate with the plurality of the first tubes, and first side plates disposed at each end of the first core and extending parallel to the longitudinal direction of the first tube to reinforce the first core, a second heat exchanger comprising a generally rectangular second core having a plurality of second tubes through which a second fluid flows, second header tanks disposed at each of longitudinal opposite ends of the second tubes and extending vertical to the longitudinal direction of the second tube to communicate with the plurality of the second tubes, and second side plates disposed at each end of the second core and extending parallel to the longitudinal direction of the second tube to reinforce the second core, and brackets fastened to each of longitudinal opposite ends of both the header tanks for attaching both the heat exchangers thereto, wherein each of the header tanks has a tubular tank body and a tank cap bonded to the tubular tank body for closing the longitudinal end of the tank body, and the brackets are bonded to both the header tanks while being engaged and fixed to the tank cap.

Thereby, as it is unnecessary to provide means for fixing bolts, such as bolt holes, in the side plate, the side plate can be smaller in size and lighter in weight.

The present invention will be described in more detail below with reference to the preferred embodiments illustrated in the attached drawings.

BRIEF DESCRIPTION OF THE DRAWINGS

FIG. 1 is a perspective view of a duplex heat exchanger according to a first embodiment of the present invention;

FIG. 2A is an exploded perspective view of a bracket according to the first embodiment of the present invention, and FIG. 2B is a perspective view of the bracket in an assembled state according to the first embodiment of the present invention;

FIG. 5 is a schematic view of a duplex heat exchanger mounted to a vehicle according to the first embodiment of the present invention;

DESCRIPTION OF THE PREFERRED EMBODIMENTS

First Embodiment

Figure 3A:
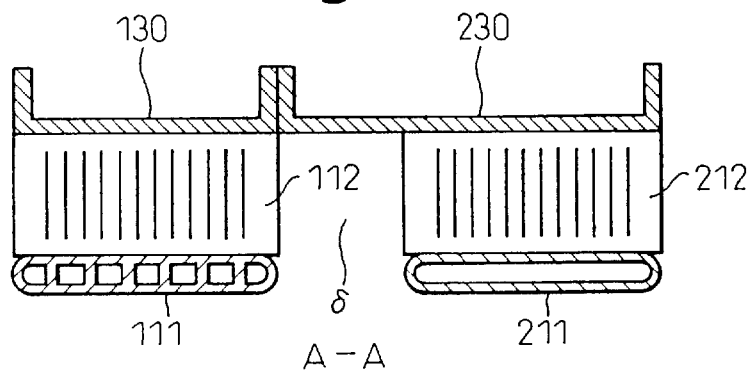
FIG. 3A is a sectional view taken along a line A—A in FIG. 1.

In this embodiment, a mounting structure for a heat exchanger according to the present invention is applied to a duplex heat exchanger in which a radiator (a first heat exchanger) 200 for cooling a vehicle engine and a condenser (a second heat exchanger) 100 for a car air-conditioner are integral with each other, and FIG. 1 is a perspective view of the duplex heat exchanger of this embodiment.

In FIG. 1, reference numeral 211 denotes a plurality of aluminum radiator tubes (first tubes) through which cooling water flows, and reference numeral 212 denotes an aluminum radiator fin having a corrugated shape bonded to an outer surface of the radiator tubes 211 for enhancing the heat exchange between cooling water and air. A generally rectangular radiator core (first core) 210 for exchanging heat between cooling water and air is constituted by the radiator fin 212 and the radiator tubes 211.

Reference numeral 220 denotes a radiator tank (a first header tank) arranged at longitudinal opposite ends of the radiator tubes 211 and extending vertical to the longitudinal direction of the radiator tubes 211. As shown in FIG. 2A, the radiator tank 220 has an aluminum radiator tank body 221 formed as a square tube to communicate with the plurality of radiator tubes 211 and an aluminum radiator tank cap 222 for closing each of longitudinal opposite ends of the radiator tank body 221.

Aluminum radiator side plates (first side plates) 230 are arranged at each of opposite ends of the radiator core 210 and extend parallel to the longitudinal direction of the radiator tubes 211 to reinforce the radiator core 210. The radiator side plate 230 is manufactured by a press working to have a U-shaped cross-section opening to a side opposite to the radiator core 210.

The radiator 200 is constructed, for example, by brazing the radiator tubes 211, the radiator tanks 220 and the radiator side plates 230 with each other to form an integral assembly.

Figure 3B:
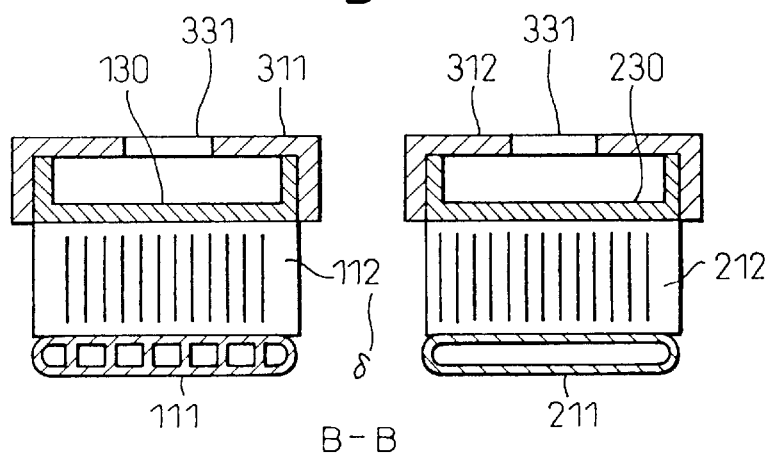
FIG. 3B is a sectional view taken along a line B—B in FIG. 1.

In FIGS. 3A and 3B, reference numeral 111 denotes an aluminum condenser tube (a second tube) extending parallel to the radiator tube 211, through which coolant flows; and reference numeral 112 denotes an aluminum corrugated condenser fin bonded to an outer surface of the condenser tube 111 for accelerating the heat exchange between coolant and air. The condenser fins 112 and the condenser tubes 111 constitute a generally rectangular condenser core (a second core) 110 for exchanging heat between coolant and air.

In this regard, a thermal insulation gap δ is provided between the condenser fin 112 and the radiator fin 212, for preventing heat of the radiator 200 (cooling water) from transferring to the condenser 100 (coolant).

In FIG. 1, reference numeral 120 denotes a condenser tank (a second header tank) arranged at each of longitudinal opposite ends of the condenser tube 111 and extending vertical to the longitudinal direction of the condenser tube 111. As shown in FIG. 2A, this condenser tank 120 is constituted by an aluminum cylindrical condenser tank body 121 to communicate with the plurality of condenser tubes 111 and an aluminum condenser tank cap 122 for closing each of longitudinal opposite ends of the condenser tank body 121.

At each of opposite ends of the condenser core 110, there are aluminum condenser side plates 130 extending parallel to the longitudinal direction of the condenser tube 111 to reinforce the condenser core 110. This condenser side plate 130 is manufactured by a press working to have a U-shaped cross-section opening to a side opposite to the condenser core 110.

The condenser 100 is constructed, for example, by brazing the condenser tubes 111, the condenser tanks 120 and the condenser side plates 130 with each other to be an integral assembly.

Figure 4:
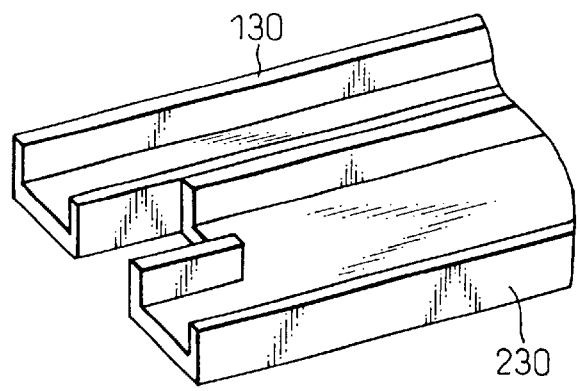
FIG. 4 is a perspective view of a side plate according to the first embodiment of the present invention.

In this regard, as shown in FIGS. 3A and 4, the condenser side plate 130 extends toward the radiator side plate 230 to be in tight contact therewith to prevent air passing through the condenser 100 from by-passing the radiator 200.

As shown in FIG. 2A, each of the tank caps 122, 222 consists of a cap body 122a, 222a for closing the tank body 121, 221, and an arm 122b, 222b formed integral with the cap body 112a, 222a and extending from the cap body 112a, 222a toward the side plate 130, 230. The cap body 112a, 222a is brazed to the tank body 121, 221, respectively, and the arm 122b, 222b is brazed to the side plate 130, 230, respectively.

As shown in FIG. 1, brackets 300 are arranged at longitudinal opposite ends of the condenser tanks 120 and the radiator tanks 220, for mounting the radiator 200 and the condenser 100 to the vehicle. As shown in FIGS. 2A and 2B, the bracket 300 is coupled to the tank caps 121, 222 so that it is engaged with the tank caps 121, 222 by first and second U-shaped hooks 311, 312 (first and second fasteners) to be hooked to the arms 122b, 222b while pressing the latter from above and below, and by a recess 320 to be engaged with a projection 222c formed in the tank cap (in this embodiment, the cap body 222a of the radiator tank cap 222).

There are holes 122d, 222d and 331 in the first and second hooks 311, 312 and the arms 122b, 222b, through which bolts 330 (fastening means) are to be inserted. The bracket 300 is fixed to the tank caps 122, 222 by the bolts 330 after being engaged with the tank caps 122, 222 by the first and second hooks 311, 312 or others.

In this regard, when the bracket 300 is mounted, the bracket 300 is slid toward the cap bodies 112a, 222a while being in contact with the tank caps 122, 222 as shown by an arrow in FIG. 2A to engage with engagement means such as the first and second hooks 311, 312 or the recess 320, and then fixed to the tank caps 300, 222.

The holes 331 in the first and second hooks 311, 312 nipping the arms 122b, 222b, provided closer to the side plates 130, 230 have a cylindrical burred portion (not shown) formed by burring work, in which a female screw is formed to be threaded to the bolt 300.

As shown in FIG. 5 and generally at a center of the bracket 300, an attachment pin (an attachment member) 340, to be fixed to a stay 601 secured to a side member 600 extending in the widthwise direction of the vehicle for reinforcing the vehicle, is bonded to the bracket 300 by, for example, brazing or welding. A rubber isolator 602 is provided between the bracket 300 and the stay 601 for absorbing the vibration of the radiator 200 and the condenser 100.

Reference numeral 610 denotes a blower for blowing cooling air onto the radiator 200 and the condenser 100. According to this embodiment, an attachment section (a female screw threaded to a bolt, in this embodiment) 350 is provided in the bracket 300 for directly fixing the blower 610 to the bracket 300, without attaching the blower 610 to the radiator 200.

As shown in FIG. 5, the blower 610 consists of a blower fan 611 (an axial flow fan in this embodiment), an electric motor 612 for driving the fan, and a shroud 613 for encircling the fan 611 and assembling the fan 611 to the heat exchanger (the radiator 200 in this embodiment). Thus, the blower 610 is attached to the attachment section 350 (the bracket 300) via the shroud 613.

In this regard, in FIG. 1, reference numeral 240 denotes a water supply port for replenishing cooling water into the radiator 200, and reference numeral 140 denotes a receiver for separating coolant flowing out from the condenser 100 into a liquid phase coolant and a gas phase coolant, discharging the liquid phase coolant and storing an excessive coolant.

Next, features of this embodiment will be described below.

According to this embodiment, since the bracket 300 is coupled to the header tanks 120, 220, it is unnecessary to provide fixing means such as bolt holes or others for fixing the bracket 300 to the side plates 130, 230. Accordingly, a size and a weight of the side plates 130, 230 can be reduced.

Since the bracket 300 is separably assembled to the radiator 200 and the condenser 100 by means of coupling means such as the hooks 311, 312 or bolt holes (female screws) 331 for fixing the bolts 330, it is possible to easily mount the radiator 200 and the condenser 100 to the vehicle and detach the same therefrom.

While the above description has been made for the embodiment in which the radiator 200 and the condenser 100 have already been incorporated into the vehicle upon the delivery thereof from a maker's factory, it is also possible to incorporate the condenser 100 into the vehicle in a service factory, for example, of a dealer or others after the vehicle, into which solely the radiator 200 has been incorporated, is delivered from the maker's factory, as the bracket 300 according to the present invention is provided with coupling means for separably coupling the bracket 300 with the radiator 200 and the condenser 100, such as hooks 311, 312 or holes (female screws) 331 for fixing bolts 330.

Even if mounting manner of the radiator 200 or others (such as a distance between the attachment pins 340 or a size of the attachment pins 340) are different from each other in accordance with kinds of vehicles, such a problem may be solved by the replacement of the bracket 300, since the bracket 300 and the tank cap 122, 222 are separate parts and the bracket 300 is coupled to the tank caps 122, 222.

Accordingly, as it is possible to solve the above problem caused by the variation of the kind of vehicle, without largely changing the design of the radiator 200 or the condenser 100, the manufacturing cost of the radiator 200 or the condenser 100 can be reduced.

Since the bracket 300 is provided with means for engaging the tank caps 122, 222 with the bracket 300, such as the first and second hooks 311, 323 or the recess 320, it is possible to easily and assuredly couple the bracket 300 to the tank caps 122, 222.

Since the radiator 200 and the condenser 100 are integral with each other via the bracket and the blower 610 is fixed to the attachment section 350 of the bracket 300, no excessive load (force) other than its own weight is applied to the radiator 200 or the condenser 100.

Thus, since it is sufficient that the side plate 130, 230 has a strength for properly reinforcing the core 110, 210, the side plate 130, 230 may be smaller in size and lighter in weight.

Second Embodiment

Figure 6A:
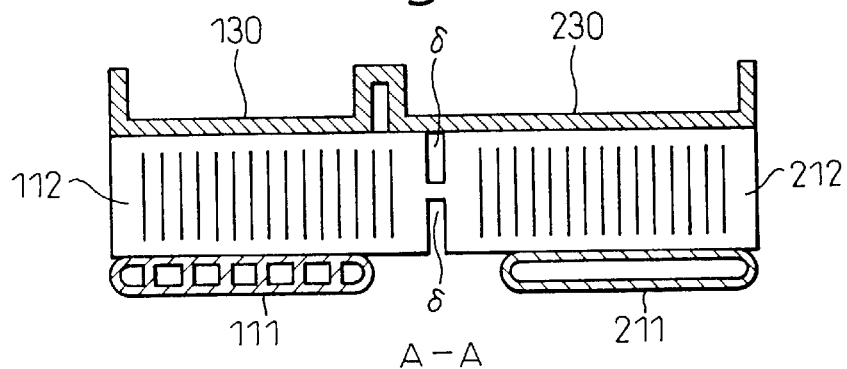
FIG. 6A is sectional view of a duplex heat exchanger according to a second embodiment of the present invention, corresponding to the sectional view taken along the line A—A in FIG. 1.
Figure 6B:
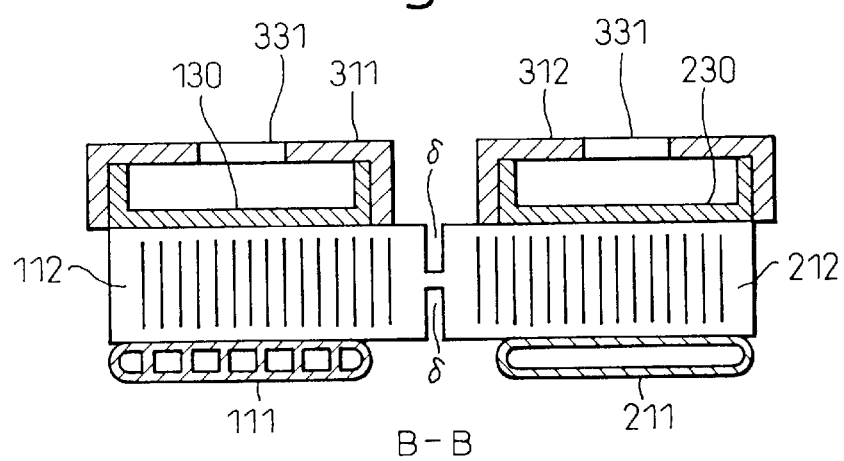
FIG. 6B is sectional view of a duplex heat exchanger according to a second embodiment of the present invention, corresponding to the sectional view taken along the line B—B in FIG. 1.
Figure 7:
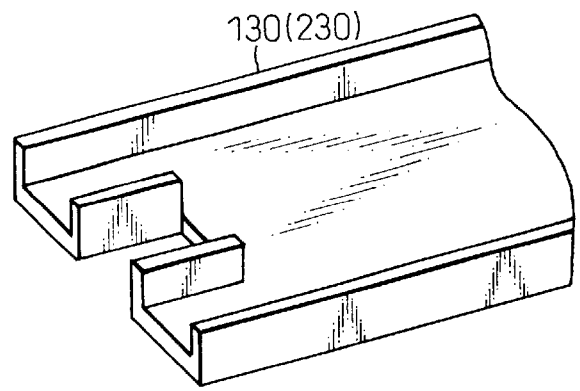
FIG. 7 is a perspective view of a side plate according to the second embodiment of the present invention.
Figure 8:
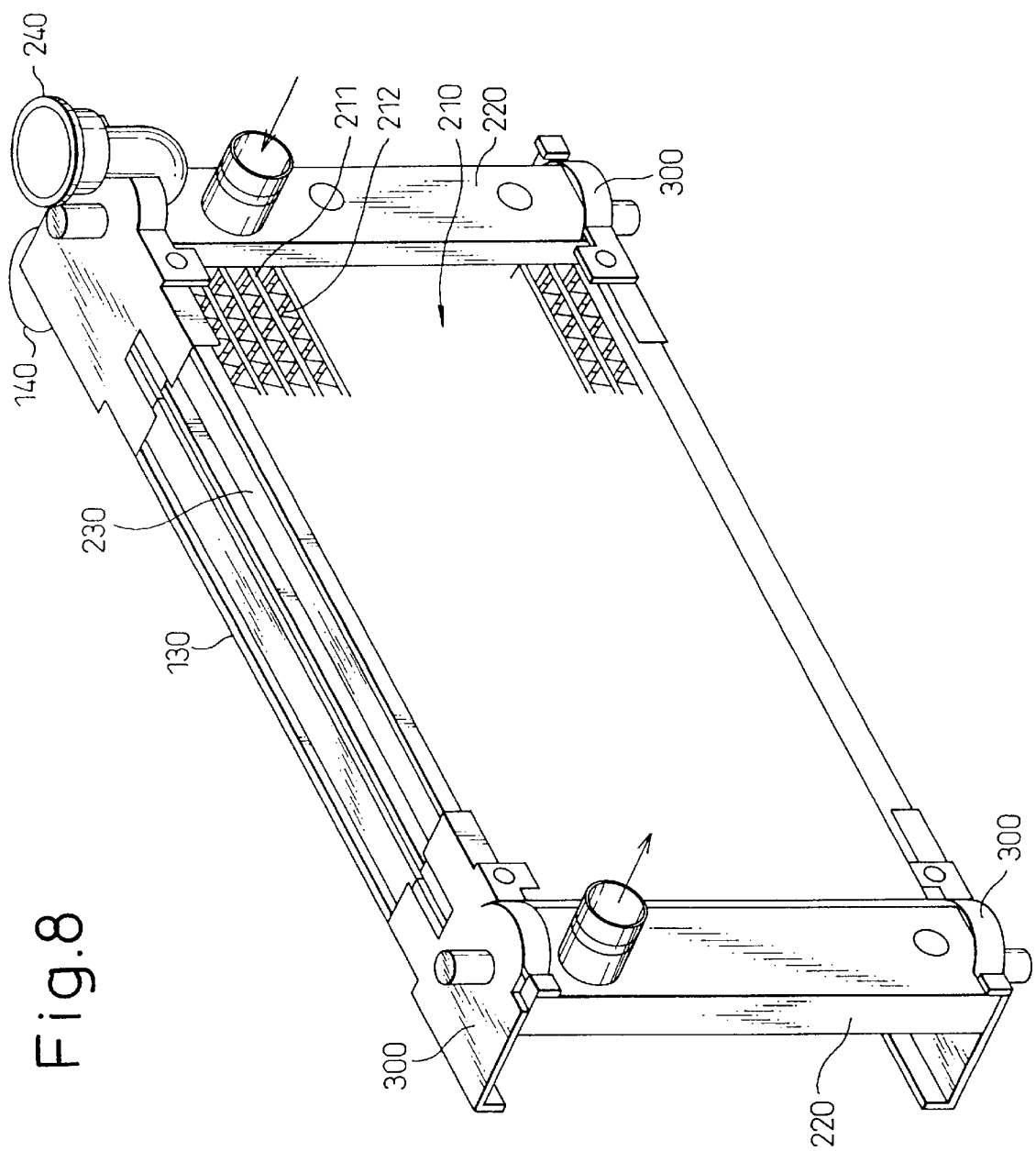
FIG. 8 is a perspective view of a duplex heat exchanger according to a third embodiment of the present invention.

While the radiator 200 and the condenser 100 are integrated with each other solely by the bracket 300 in the first embodiment, a radiator fin 212 and a condenser fin 112 are formed from a single plate as an integral body, and a radiator side plate 230 and a condenser side plate 130 are also formed from a single plate as an integral body according to this embodiment as shown in FIGS. 6A, 6B and 7.

In this regard, the radiator fin 212 and the condenser fin 112 are not integral with each other all over but are partially coupled as shown in FIGS. 6A and 6B.

According to this embodiment, while the fins 212, 112 and the side plates 130, 230 are integral with each other, the present invention is not limited thereto but, for example, the header tanks 120, 220 may be integral with each other.

Third Embodiment

While the bracket 300 is fixed to the tank caps 122, 222 by the bolts 330 after being engaged with the tank caps 122, 222 by means of the first and second hooks 311, 312 or others in the above embodiments, the bolts are eliminated according to the third embodiment, so that the bracket 300 is engaged with the tank caps 122, 222 by the first and second hooks 311, 312 and are then brazed thereto to be integral therewith.

In this regard, even if mounting manner of the radiator 200 or others (such as a distance between the attachment pins 340 or a size of the attachment pins 340) are different from each other in accordance with kinds of vehicles, such a problem may be solved by the replacement of the bracket 300, since the bracket 300 and the tank cap 122, 222 are separate parts and the bracket 300 is brazed to the tank caps 122, 222.

Other Embodiments

While a front projected area of the radiator core 210 and that of the condenser core 110 are generally equal to each other in the above-mentioned embodiment, the present invention is not limited thereto, but is applicable to an arrangement in which the front projected areas of the radiator core 210 and the condenser 110 are different from each other. In this regard, the front projected area of the core is defined as an area of the core parallel to a plane vertical to the air-flowing direction.

Figure 9:
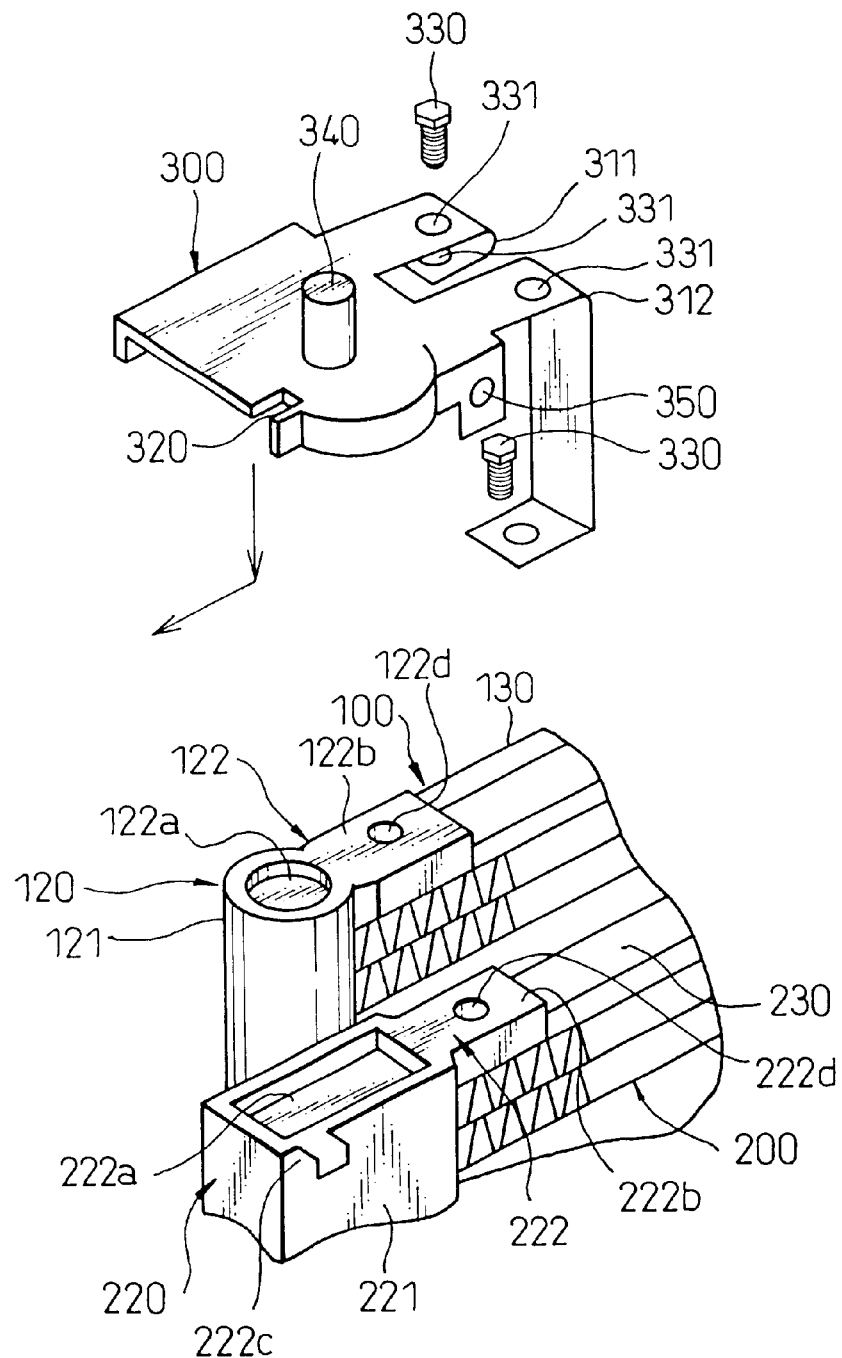
FIG. 9 is an exploded perspective view of a bracket according to a further embodiment of the present invention.

In this regard, as shown in FIG. 9, if the front projected areas of the cores are different from each other, such a difference in size of the cores is preferably absorbed by varying a size of the hook (the second hook 312 in this embodiment).

Also, in the above embodiment, although the header tank and the side plate are made of aluminum, the present invention should not be limited thereto, but such parts may be made of other metals such as iron or others.

It should be noted that while the present invention has been described based on the particular embodiments, it may be variously changed and modified, without departing from the scope of claim or spirit of the present invention, by a person with ordinary skill in the art.

What is claimed is:

1. A mounting structure for a heat exchanger, comprising:
   a first heat exchanger comprising a generally rectangular core having a plurality of tubes for passing fluid therethrough, radiator tanks communicating with the plurality of tubes disposed at each of longitudinal opposite ends and extending vertical to the longitudinal direction of the tubes, and a U-shaped side plate for reinforcing the core disposed at each end of the core and extending parallel to the longitudinal direction of the tubes, and
   a bracket separably coupled to each of longitudinal opposite ends of the radiator tank for mounting the heat exchanger, wherein
   each bracket is provided with coupling means for coupling a second heat exchanger;
   each radiator tank comprises a tubular tank body and a tank cap attached to the tank body;
   each tank cap includes a cap body for closing a longitudinal end of the tank body and an arm extending from the tank body toward a respective U-shaped side plate, said arm engaging said respective U-shaped side plate; and
   each bracket includes engagement means formed by bending an end of each bracket and each bracket is coupled to a respective arm of the tank cap by inserting the engagement means in the longitudinal direction of the side plate into a space between the arm of the tank cap and the side plate.

2. A mounting structure according to claim 1, wherein each bracket is provided with an attachment section for attaching a blower for blowing air to the heat exchanger.

3. A mounting structure according to claim 2, wherein each bracket and the radiator tank are separably coupled to each other by screws.

4. A mounting structure according to claim 2, wherein the first heat exchanger and the second heat exchanger are integral with each other via a portion other than the bracket.

5. A mounting structure according to claim 1, wherein each bracket is provided with a female screw section for screw-engaging with a blower for blowing air to the heat exchanger.

6. A mounting structure according to claim 1, wherein each bracket and the radiator tank are separably coupled to each other by screws.

7. A mounting structure according to claim 1, wherein the heat first exchanger and the second heat exchanger are integral with each other via a portion other than the bracket.

8. A mounting structure according to claim 1 wherein each bracket and the respective arm of the tank cap is fixed by the engagement means.

9. A mounting structure according to claim 1 wherein each bracket is fixed to the respective arm of the tank cap by fasten means.

10. A mounting structure according to claim 1 wherein a space is provided between a base surface of the arm and an upper surface of the respective side plate opposite to the core.

11. A mounting structure according to claim 1 wherein a portion of each bracket is coupled to the respective arm of the tank cap, the portion of the bracket is offset in the longitudinal direction of the side plate from the radiator tank.

12. A mounting structure for a heat exchanger, comprising:
    a heat exchanger comprising a generally rectangular core having a plurality of tubes for passing fluid therethrough, tubular tank bodies communicating with the plurality of tubes disposed at each of longitudinal opposite ends and extending vertical to the longitudinal direction of the tubes, tank caps bonded to the tank bodies for closing each longitudinal end thereof, and U-shaped side plates for reinforcing the core disposed at each longitudinal end of the tubes, and
    a bracket separably coupled to the tank cap for mounting the heat exchanger to a vehicle; wherein
    each tank cap includes a cap body for closing a longitudinal end of the tank body and an arm extending from the tank body toward a respective U-shaped side plate, said arm engaging said respective U-shaped side plate; and
    each bracket includes engagement means formed by bending an end of each bracket and each bracket is coupled to a respective arm of the tank cap by inserting the engagement means in the longitudinal direction of the side plate into a space between the arm of the tank cap and the side plate.

13. A duplex heat exchanger comprising:
    a first heat exchanger comprising a generally rectangular first core having a plurality of first tubes through which a first fluid flows, first radiator tanks disposed at each of longitudinal opposite ends of the first tubes and extending vertical to the longitudinal direction of the first tubes to communicate with the plurality of first tubes, and first U-shaped side plates disposed at each end of the first core and extending parallel to the longitudinal direction of the first tubes to reinforce the first core,
    a second heat exchanger comprising a generally rectangular second core having a plurality of second tubes through which a second fluid flows, second radiator tanks disposed at each of longitudinal opposite ends of the second tubes and extending vertical to the longitudinal direction of the second tubes to communicate with the plurality of second tubes, and second side plates disposed at each end of the second core and extending parallel to the longitudinal direction of the second tubes to reinforce the second core, and
    a bracket separably fastened to each of longitudinal opposite ends of both of the first radiator tanks for attaching both the heat exchangers thereto;
    each first radiator tank comprises a tubular tank body and a tank cap attached to the tank body;
    each tank cap includes a cap body for closing a longitudinal end of the tank body and an arm extending from the tank body toward a respective first U-shaped side plate, said arm engaging said respective first U-shaped side plate; and
    each bracket includes engagement means formed by bending an end of each bracket and each bracket is coupled to a respective arm of the tank cap by inserting the engagement means in the longitudinal direction of the first U-shaped side plate into a space between the arm of the tank cap and the U-shaped side plate.

14. A duplex heat exchanger comprising:
    a first heat exchanger comprising a generally rectangular first core having a plurality of first tubes through which a first fluid flows, first radiator tanks disposed at each of longitudinal opposite ends of the first tubes and extending vertical to the longitudinal direction of the first tubes to communicate with the plurality of first tubes, and first U-shaped side plates disposed at each end of the first core and extending parallel to the longitudinal direction of the first tubes to reinforce the first core, a second heat exchanger comprising a generally rectangular second core having a plurality of second tubes through which a second fluid flows, second radiator tanks disposed at each of longitudinal opposite ends of the second tubes and extending vertical to the longitudinal direction of the second tubes to communicate with the plurality of second tubes, and second side plates disposed at each end of the second core and extending parallel to the longitudinal direction of the second tubes to reinforce the second core, and a bracket separably fastened to each of longitudinal opposite ends of both of the radiator tanks for attaching both the heat exchangers thereto, wherein each of the first radiator tanks has a tubular tank body and a tank cap bonded to the tubular tank body for closing the longitudinal end of the tank body, and the bracket is bonded to both of the radiator tanks while being engaged and fixed to the tank cap;

each tank cap includes a cap body for closing a longitudinal end of the tank body and an arm extending from the tank body toward a respective first U-shaped side plate, said arm engaging said respective first U-shaped side plate; and each bracket includes engagement means formed by bending an end of each bracket and each bracket is coupled to a respective arm of the tank cap by inserting the engagement means in the longitudinal direction of the first U-shaped side plate into a space between the arm of the tank cap and the U-shaped side plate.

* * * * *

UNITED STATES PATENT AND TRADEMARK OFFICE
CERTIFICATE OF CORRECTION

PATENT NO. : 6,705,387 B2  Page 1 of 1
DATED : March 16, 2004
INVENTOR(S) : Hiroshi Kokubunji et al.

It is certified that error appears in the above-identified patent and that said Letters Patent is hereby corrected as shown below:

<u>Title page,</u>
Item [75], Inventors, "Tatsuo Ozaki,", "Kariya (JP)" should be -- Okazaki (JP) --

<u>Column 7,</u>
Line 51, "heat first exchanger" should read -- first heat exchanger --

Signed and Sealed this

Fourteenth Day of September, 2004

JON W. DUDAS
*Director of the United States Patent and Trademark Office*